United States Patent
Teverovskiy et al.

(10) Patent No.: US 10,731,056 B2
(45) Date of Patent: Aug. 4, 2020

(54) ADHESIVE ARTICLES AND METHODS OF MAKING THE SAME

(71) Applicant: 3M INNOVATIVE PROPERTIES COMPANY, St. Paul, MN (US)

(72) Inventors: Georgiy Teverovskiy, St. Louis Park, MN (US); Maria A. Appeaning, St. Paul, MN (US); Chetan P. Jariwala, Woodbury, MN (US); Marie A. Boulos, West St. Paul, MN (US); David J. Kinning, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/490,365

(22) PCT Filed: Feb. 15, 2018

(86) PCT No.: PCT/US2018/018367
§ 371 (c)(1),
(2) Date: Aug. 30, 2019

(87) PCT Pub. No.: WO2018/169642
PCT Pub. Date: Sep. 20, 2018

(65) Prior Publication Data
US 2020/0071572 A1    Mar. 5, 2020

Related U.S. Application Data

(60) Provisional application No. 62/473,000, filed on Mar. 17, 2017.

(51) Int. Cl.
*C09J 7/40* (2018.01)
*C09J 7/38* (2018.01)
(Continued)

(52) U.S. Cl.
CPC .............. *C09J 7/401* (2018.01); *C08K 5/435* (2013.01); *C09J 7/201* (2018.01); *C09J 7/38* (2018.01);
(Continued)

(58) Field of Classification Search
None
See application file for complete search history.

(56) References Cited

U.S. PATENT DOCUMENTS 2,532,011 A    11/1950    Dahlquist
2,803,565 A    8/1957    Sagar
(Continued)

FOREIGN PATENT DOCUMENTS

EP    0592884    4/1994
WO    WO 2017-074709    5/2017
(Continued)

OTHER PUBLICATIONS

Jang, "Shear-Induced Dry Transfer of Reduced Graphene Oxide Thin Film via Roll-to-Roll Printing", Applied Physics Letters, Feb. 29, 2016, vol. 108 (091601), No. 9, 5 pages.
(Continued)

*Primary Examiner* — Frank D Ducheneaux
(74) *Attorney, Agent, or Firm* — Bradford B. Wright

(57) ABSTRACT

An adhesive article includes a pressure-sensitive adhesive layer with a release liner releasably adhered thereto. The release liner comprises a thermoplastic polymer and a first release agent represented by the formula: Each $R^1$ represents a hydrocarbylene group having from 2 to 40 carbon atoms; each $R_f$ independently represents a perfluorinated alkyl group of having 3 to 5 carbon atoms; and each $X^1$ is —NH— or a covalent bond. Methods of making the adhesive articles are also disclosed.

(Continued)

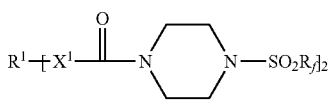

13 Claims, 1 Drawing Sheet

(51) Int. Cl.
    *C08K 5/435*     (2006.01)
    *C09J 7/20*     (2018.01)

(52) U.S. Cl.
    CPC ............ *C09J 7/383* (2018.01); *C09J 7/385* (2018.01); *C09J 7/405* (2018.01); *C09J 2421/00* (2013.01); *C09J 2433/00* (2013.01); *C09J 2467/005* (2013.01); *C09J 2483/00* (2013.01)

(56) References Cited

U.S. PATENT DOCUMENTS

| | | |
|---|---|---|
| 2,803,613 A | 8/1957 | Kather |
| 3,734,962 A | 5/1973 | Niederpruem |
| 5,025,052 A | 6/1991 | Crater |
| 5,110,667 A | 5/1992 | Galick |
| 5,451,622 A | 9/1995 | Boardman |
| 5,898,046 A | 4/1999 | Raiford |
| 5,977,390 A | 11/1999 | Raiford |
| 6,003,474 A | 12/1999 | Slater |
| 6,063,474 A | 5/2000 | Raiford |
| 6,114,419 A | 9/2000 | Liss |
| 6,174,964 B1 | 1/2001 | Jariwala |
| 6,380,289 B1 | 4/2002 | Thompson, Jr. |
| 6,858,290 B2 | 2/2005 | Mrozinski |
| 7,229,687 B2 | 6/2007 | Kinning |
| 7,396,866 B2 | 7/2008 | Jariwala |
| 7,639,351 B2 | 12/2009 | Chen |
| 2006/0149012 A1 | 7/2006 | Terrazas |
| 2008/0306238 A1 | 12/2008 | Jariwala |

FOREIGN PATENT DOCUMENTS

| | | |
|---|---|---|
| WO | WO 2017-100045 | 6/2017 |
| WO | WO 2018-005190 | 1/2018 |
| WO | WO 2018-005285 | 1/2018 |
| WO | WO 2018-005287 | 1/2018 |
| WO | WO 2018-093623 | 5/2018 |

OTHER PUBLICATIONS

International Search Report for PCT International Application No. PCT/US2018/018367, dated May 7, 2018, 4 pages.

ADHESIVE ARTICLES AND METHODS OF MAKING THE SAME

CROSS-REFERENCE TO RELATED APPLICATIONS

This application is a national stage filing under 35 U.S.C. 371 of International Application PCT/US2018/018367, filed Feb. 15, 2018, which claims the benefit of U.S. Provisional Application No. 62/473,000, filed Mar. 17, 2017.

TECHNICAL FIELD

The present disclosure broadly relates to adhesive articles and methods of making them.

BACKGROUND

Adhesive tape comes in many varieties such as, for example, single-sided or double-sided tape, typically wound into a roll. Double-sided adhesive tape (also termed "adhesive transfer tape") has adhesive properties on both sides, generally covered by one or two releasable liners (release liners) that protect the adhesive, which is/are removed prior to when the adhesive layer is bonded to a substrate. In some embodiments, a double-sided release liner is used, wherein a first release layer is coated on a first major surface of a backing, and a second release layer is coated on a second major surface of the release liner opposite the first major surface. Typically, the first and second release layers are designed to have different release properties to facilitate dispensing the tape in roll form. For example, the first release layer may bind somewhat more tightly to the adhesive layer than the second release layer in order to achieve a clean unwind of the roll.

Polymeric release materials are known to be used as release layers on liners (e.g., flexible backing films, foils, or papers) in order to provide a surface from which a pressure-sensitive adhesive can be easily and cleanly removed. For example, it is known to apply a polymeric release material to the back surface of an adhesive tape backing in order to allow the tape to be provided in roll form and to be easily and conveniently dispensed by unwinding the roll.

Release layers have been applied to surfaces of liners by preparing the release components in solvent, coating the solution onto a desired surface, and drying to evaporate the solvent. One example of a release coating formed using a conventional solvent-based process is found in U.S. Pat. No. 2,532,011 (Dahlquist et al.).

Solvent-based processes, however, have become increasingly less desirable due to special handling and environmental concerns associated therewith. For example, conventional release materials are typically applied to a substrate in a coating step that is separate from the preparation of the substrate itself.

SUMMARY

The present disclosure overcomes these problems by providing adhesive articles incorporating extruded release liners containing a fluorinated melt additive that blooms to the surface of the release liner during extrusion.

Accordingly, in one aspect, the present disclosure provides an adhesive article comprising a pressure-sensitive adhesive layer having first and second opposed major surfaces, wherein a first release liner is releasably adhered to the first major surface, and wherein the first release liner comprises a first thermoplastic polymer and a first release agent represented by the formula:

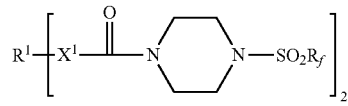

wherein
each $R^1$ represents a hydrocarbylene group having from 2 to 40 carbon atoms;
each $R_f$ independently represents a perfluorinated alkyl group of having 3 to 5 carbon atoms; and
each $X^1$ is —NH— or a covalent bond.

In some embodiments, the adhesive article further comprises a second release liner releasably adhered to the second major surface, wherein the second release liner independently comprises a second thermoplastic polymer and a second release agent independently represented by the formula:

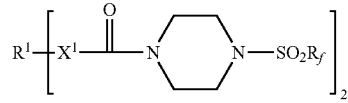

wherein $R^1$, $R_f$, and $X^1$ are as previously defined.

In another aspect, the present disclosure provides an adhesive article comprising a thermoplastic backing having first and second major surfaces, and a pressure-sensitive adhesive layer securely adhered to the first major surface, further comprising a release agent disposed at the second major surface, wherein the release agent is represented by the formula:

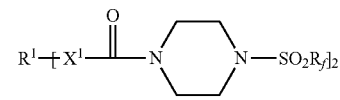

wherein
each $R^1$ represents a hydrocarbylene group having from 2 to 40 carbon atoms;
each $R_f$ independently represents a perfluorinated alkyl group of having 3 to 5 carbon atoms; and
each $X^1$ is —NH— or a covalent bond.

Adhesive articles according to the present disclosure provide an environmentally attractive alternative to adhesive articles containing solvent-coated release materials. The consolidation of the release liner manufacturing process to a single extrusion step also provides significant cost-savings by obviating a coating and curing step.

As used herein:

The term "hydrocarbylene" refers to any divalent radical formed by removing two hydrogen atoms from a hydrocarbon.

The chemical group "Me" refers to methyl.

The term "moiety" refers to a contiguous portion of a molecule which may be a monovalent group or a polyvalent group (e.g., a divalent group).

The term "plastic" refers to any of numerous organic synthetic or processed materials that are mostly thermoplastic or thermosetting polymers of high molecular weight and that can be made into objects, films, or filaments.

The term "pressure-sensitive adhesive" (PSA) refers to an adhesive characterized by being normally tacky at room temperature (e.g., 20 degrees Celsius (° C.)) and forming a bond to a surface by the application of, at most, very light finger pressure. PSAs possess a balance of viscoelastic and elastic properties which result in a four-fold balance of adhesion, cohesion, stretchiness and elasticity. They have sufficient cohesiveness and elasticity so that they can be handled and removed from surfaces without leaving a residue even though they are tacky. PSAs do not embrace compositions merely because they are sticky or adhere to a substrate.

The term "releasably adhered" means that an adherend can be cleanly removed by peeling without cohesive failure of the pressure-sensitive to which it is adhered.

The term "securely adhered" means that an adherend cannot be cleanly removed by peeling without cohesive failure of the pressure-sensitive to which it is adhered.

The term "perfluorinated" in reference to a chemical species (e.g., group or molecule) means that all hydrogen atoms in the species have been replaced by fluorine.

Features and advantages of the present disclosure will be further understood upon consideration of the detailed description as well as the appended claims.

Figure 1:
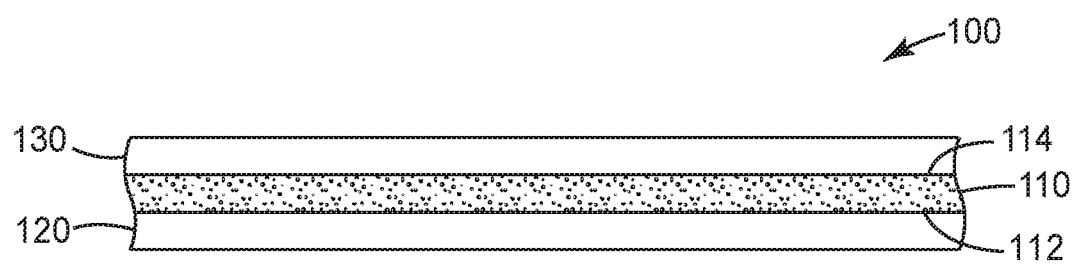
FIG. 1 is a schematic side view of exemplary adhesive article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, in one embodiment, adhesive article 100 comprises pressure-sensitive adhesive layer 110 having first and second opposed major surfaces (112, 114). First release liner 120 is releasably adhered to the first major surface 112 of pressure-sensitive adhesive layer 110. First release liner 120 comprises a first thermoplastic polymer and a first release agent. If present, optional backing 130 is securely adhered to second major surface 114 of pressure-sensitive adhesive layer 110.

Figure 2:
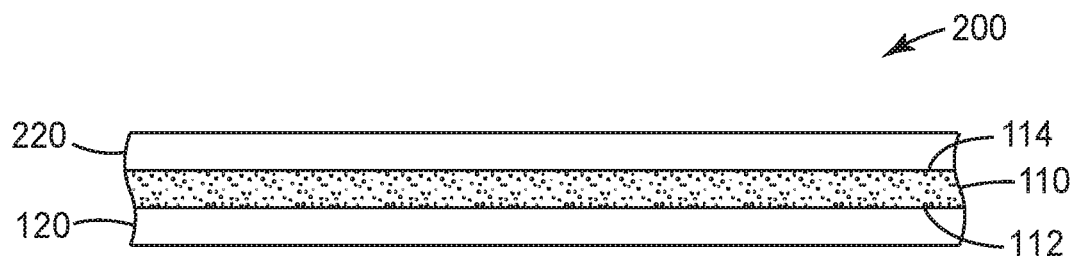
FIG. 2 is a schematic side view of exemplary adhesive article 200 according to the present disclosure.

In another embodiment, shown in FIG. 2, adhesive article 200 includes pressure-sensitive adhesive layer 110 having first and second opposed major surfaces (112, 114). First release liner 120 is releasably adhered to the first major surface 112 and second release liner 220 is releasably adhered to second major surface 114. At least one, and preferably both, of first and second release liners (120, 220) independently comprises a thermoplastic polymer and a release agent according to the present disclosure.

Release agents useful in practice of the present disclosure include those represented by the chemical formula:

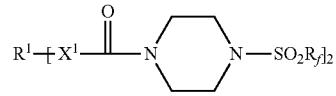

$R^1$ represents a hydrocarbylene group having from 2 to 40 carbon atoms, preferably 2 to 18 carbon atoms, and more preferably 6 to 15 carbon atoms. $R^1$ may be linear or branched, saturated or unsaturated, cyclic or acyclic, a combination thereof such as, for example, arylene, alkarylene, alkylene, or aralkylene. $R^1$ may contain aromatic and/or aliphatic groups. In some embodiments, $R^1$ is alkylene having from 2 to 18 carbon atoms, or 2 to 12 carbon atoms. In some embodiments, $R^1$ is arylene having from 6 to 15 carbon atoms, preferably 6 to 10 carbon atoms. Examples of hydrocarbylene groups $R^1$ include phenylene (e.g., 1,4-phenylene), naphthylen-1,4-diyl, ethan-1,2-diyl, propane-1,3-diyl, propane-1,2-diyl, butane-1,4-diyl, hexan-1,6-diyl, octan-1,8-diyl, dodecane-1,12-diyl, hexadecan-1,16-diyl, octadecan-1,18-diyl, p-phenylene, m-phenylene, o-phenylene, —$C_6H_6CH_2C_6H_6$—, and —$C_6H_6C(CH_3)_2C_6H_6$—.

$R_f$ independently represents a perfluorinated alkyl group of having 3 to 5 carbon atoms; preferably 4. Examples of perfluorinated alkyl groups $R_f$ include perfluoro-n-butyl, perfluoro-n-propyl, perfluoro-n-pentyl, perfluoroisobutyl, perfluoroisopropyl, and perfluoro-t-butyl. Perfluoro-n-butyl typically is preferred.

$R_f$ groups can be incorporated by electrochemical fluorination of the corresponding perfluoroalkylsulfonyl halide, which can be prepared by known methods and/or obtained from commercial sources.

Each $X^1$ is independently —NH— or a covalent bond.

In some preferred embodiments, the release agent has the chemical formula:

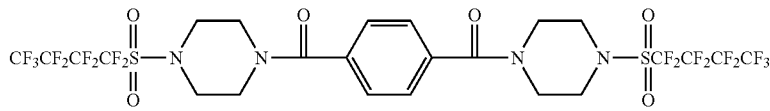

Release agents such as those described above can be prepared using known organic reactions, such as, for example, those disclosed in U.S. Pat. No. 5,451,622 (Boardman et al.). A preferred method of preparation is by the reaction of fluoroaliphatic radical-containing sulfonyl fluorides, $R_fSO_2F$, with piperazine followed by reaction of the resulting fluoroaliphatic radical-containing sulfonylpiperazine with various organic reactants.

Representative reaction schemes for the preparation of fluoroaliphatic radical-containing piperazine compounds are outlined below, where $R_f$ is as described above for Formula I and where X is a leaving group such as, e.g., halogen (e.g., Cl, Br, I; leaving as halide) or tosyloxy (leaving as tosylate), and $R^1$ together with the rest of the depicted moiety up to but not including the depicted piperazine is $R^1$ as defined above.

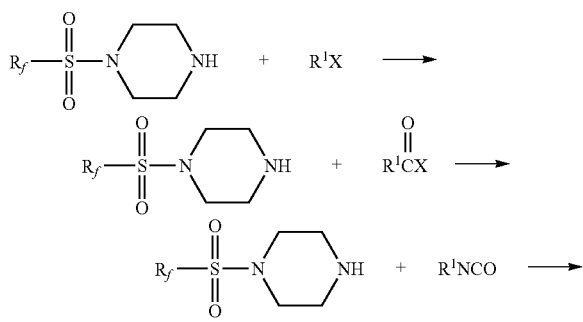

Other suitable methods are within the capability of those of ordinary skill in the art.

Thermoplastic polymers useful in practice of the present disclosure include, for example, polyesters (e.g., polyethylene terephthalate and polycaprolactone), cellulosic polymers (e.g., cellulose acetate), polyamides (e.g., nylon-6 and nylon-6,6), polyurethanes, and polyolefins (e.g., polypropylene, polyethylene, and biaxially oriented polypropylene). Other thermoplastic polymers may also be used. Many thermoplastic polymers are commercially available.

Release liners according to this disclosure can be made, for example, by blending or otherwise uniformly mixing the alkylated fluorochemical oligomer and the polymer, for example by intimately mixing the oligomer with pelletized or powdered polymer, and melt extruding the mixture into shaped articles such as pellets, fibers, or films by known methods. The additive can be mixed in with the polymer during melt processing (e.g., extrusion) at the desired final concentration, or it can be mixed with the polymer in the form of a "masterbatch" (concentrate) of the additive in the polymer, which is then added in appropriate amount during melt processing. Masterbatches typically contain from about 10% to about 25% by weight of the fluorochemical additive. Also, an organic solution of the additive may be mixed with the powdered or pelletized polymer, the mixture dried to remove solvent, then melted and extruded into the desired shaped article. Alternatively, molten additive (as a compound(s) or masterbatch) can be injected into a molten polymer stream to form a blend just prior to extrusion into the desired shaped article.

The amount of fluorochemical compound in the composition is that amount sufficient to produce a shaped article having a surface with the desired properties of oil and water repellency and/or soiling resistance. Preferably, the amount of fluorochemical compound will be that amount which provides from about 100 to 10,000 ppm fluorine, more preferably 200 to 5000 ppm, most preferably 300 to 3000 ppm fluorine, based on the weight of the release liner.

After melt extrusion of the release liner, an annealing step may be carried out to enhance release properties. Annealing allows the fluorinated release agent to migrate to any exposed surface of the thermoplastic polymer with a resultant enhancement of adhesive release properties. If performed, the release liner is typically annealed for at a temperature and for a time sufficient to increase the amount of fluorochemical additive at the surface. Effective time and temperature will bear an inverse relationship to one another and a wide variety of conditions will be suitable. Using polypropylene, for example, the annealing process can be conducted below the melt temperature at about 50° C. to 120° C. for a period of about 30 seconds to 10 minutes. Annealing may also be effected by contact with heated rolls, such as embossing rolls, at 50° C. to 160° C. for periods of about 1 to 30 seconds. In some cases, the presence of moisture during annealing, e.g., by using an autoclave to anneal, can improve the effectiveness of the release agent. Annealing may also serve to reduce the amount of release agent necessary by maximizing fluorine content at the surface of the polymer.

Various additives in addition to the release agent may be blended into the thermoplastic resin prior to extrusion, or they may be added directly to the extruder. These additives are included in typical amounts for the purpose for which they are intended, and include fillers, colorants (e.g., dyes and pigments), slip agents, anti-blocking agents, processing aids, and the like.

In the case of double release liner constructions, it is preferred that both release liners be extruded and of similar chemical composition, although ratios of components may vary. However, it is also possible that one of the release liners may be of a different construction such as, for example, a solvent-coated release layer on a plastic, paper, or foil liner. Other release materials that can be used as release layers with such optional liners include silicones, perfluoroethers, fluorocarbons, polyurethanes, and the like. Various release liners are commercially available; for example, from Rayven, Inc. of St. Paul, Minn.

Any pressure-sensitive adhesive may be used in practice of the present disclosure (e.g., including thermosetting and non-thermosetting PSAs). Exemplary useful PSAs include acrylic PSAs, natural rubber PSAs, tackified block copolymer PSAs, polyvinyl acetate PSAs, ethylene vinyl acetate PSAs, silicone PSAs, polyurethane PSAs, and thermosettable pressure-sensitive PSAs such as epoxy acrylate or epoxy polyester pressure-sensitive PSAs. These types of pressure-sensitive adhesives are well-known in the art. PSAs may also include additives such as cross-linking agents, fillers, gases, blowing agents, glass or polymeric microspheres, silica, calcium carbonate fibers, surfactants, and the like. If present, the additives are typically included in amounts sufficient to effect the desired properties.

The PSA layer may be coated as a monomer syrup and cured while in contact with a release liner or optional backing according to known general methods of making adhesive articles, or it may be pressure-laminated to the release liner after being fully formed, for example.

Exemplary suitable optional backings include polyethylene films, polypropylene (including biaxially-oriented polypropylene) films, polyester films, polyethylene or polypropylene coated papers, papers (e.g., Kraft papers), metal foils, non-woven and woven fabrics, and combinations thereof. Many suitable backings are commercially available.

During extrusion, the release agent preferentially migrates to any air/polymer melt interface such that if extruded onto a carrier belt the release agent will migrate preferentially to only one surface (i.e., the exposed surface). Accordingly, to manufacture double-sided release liners, laminates of two single-sided release liners may be useful. Alternatively, the optional annealing step after separation from the carrier may be useful to promote migration of the release agent to the surface in contact with the carrier during manufacture.

Adhesive articles according to the present disclosure include single-sided adhesive tapes, strips, and sheets having a PSA layer securely adhered to a flexible backing (either with a separate release liner or with the backing also serving as the release liner by virtue of the release agent on the surface of the backing opposite the PSA layer, as is known to those of skill in the art).

Adhesive articles according to the present disclosure include double-sides adhesive tapes, strips, and sheets having a PSA layer securely adhered to a flexible liner(s) (either with two separate release liners or a double-sided release liner, as is known to those of skill in the art.

SELECT EMBODIMENTS OF THE PRESENT DISCLOSURE

In a first embodiment, the present disclosure provides an adhesive article comprising a pressure-sensitive adhesive layer having first and second opposed major surfaces, wherein a first release liner is releasably adhered to the first major surface, and wherein the first release liner comprises a first thermoplastic polymer and a first release agent represented by the formula:

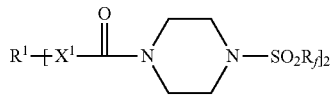

wherein each $R^1$ represents a hydrocarbylene group having from 2 to 40 carbon atoms;

each $R_f$ independently represents a perfluorinated alkyl group of having 3 to 5 carbon atoms; and each $X^1$ is —NH— or a covalent bond.

In a second embodiment, the present disclosure provides an adhesive article according to the first embodiment, wherein $R^1$ has from 2 to 18 carbon atoms.

In a third embodiment, the present disclosure provides an adhesive article according to the first or second embodiment, wherein each $X^1$ is —NH—.

In a fourth embodiment, the present disclosure provides an adhesive article according to any one of the first to third embodiments, wherein the first thermoplastic polymer is selected from the group consisting of polyesters, cellulosic polymers, polyamides, and polyolefins.

In a fifth embodiment, the present disclosure provides an adhesive article according to any one of the first to fourth embodiments, wherein the pressure-sensitive adhesive layer comprises at least one of an acrylic pressure-sensitive adhesive, a rubber pressure-sensitive adhesive, or a silicone pressure-sensitive adhesive.

In a sixth embodiment, the present disclosure provides an adhesive article according to any one of the first to fifth embodiments, wherein the first release agent is predominantly disposed at the first major surface.

In a seventh embodiment, the present disclosure provides an adhesive article according to any one of the first to sixth embodiments, further comprising a backing securely adhered to the second major surface.

In an eighth embodiment, the present disclosure provides an adhesive article according to the seventh embodiment, wherein the backing comprises a flexible plastic film, metal foil, or paper.

In a ninth embodiment, the present disclosure provides an adhesive article according to any one of the first to eighth embodiments, further comprising a second release liner is releasably adhered to the second major surface, wherein the second release liner independently comprises a second thermoplastic polymer and a second release agent independently represented by the formula:

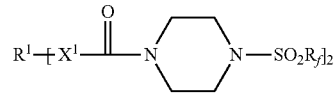

wherein $R^1$, $R_f$, and $X^1$ are as previously defined.

In a tenth embodiment, the present disclosure provides a method according to any one of the first to ninth embodiments, wherein the adhesive article comprises an adhesive sheet.

In an eleventh embodiment, the present disclosure provides an adhesive article according to any one of the first to tenth embodiments, wherein the adhesive article comprises an adhesive tape.

In a twelfth embodiment, the present disclosure provides an adhesive article comprising a thermoplastic backing having first and second major surfaces, and a pressure-sensitive adhesive layer securely adhered to the first major surface, further comprising a release agent disposed at the second major surface, wherein the release agent is represented by the formula:

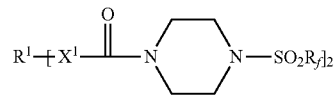

wherein each $R^1$ represents a hydrocarbylene group having from 2 to 40 carbon atoms;

each $R_f$ independently represents a perfluorinated alkyl group of having 3 to 5 carbon atoms; and each $X^1$ is —NH— or a covalent bond.

In a thirteenth embodiment, the present disclosure provides a method of making an adhesive article, the method comprising contacting a pressure-sensitive adhesive layer with a release liner having first and second major surfaces, wherein the release liner comprises a thermoplastic polymer and a release agent represented by the formula:
wherein

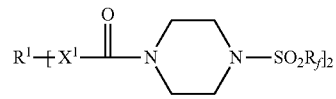

each $R^1$ represents a hydrocarbylene group having from 2 to 40 carbon atoms;

each $R_f$ independently represents a perfluorinated alkyl group of having 3 to 5 carbon atoms; and each $X^1$ is —NH— or a covalent bond.

In a fourteenth embodiment, the present disclosure provides a method according to the thirteenth embodiment, wherein $R^1$ has from 2 to 18 carbon atoms.

In a fifteenth embodiment, the present disclosure provides a method according to the thirteenth or fourteenth embodiment, wherein each $X^1$ is —NH—.

In a sixteenth embodiment, the present disclosure provides a method according to the any one of the thirteenth to fifteenth embodiments, wherein the thermoplastic polymer is selected from the group consisting of polyesters, cellulosic polymers, polyamides, and polyolefins.

In a seventeenth embodiment, the present disclosure provides a method according to the any one of the thirteenth to sixteenth embodiments, wherein the pressure-sensitive adhesive layer comprises at least one of an acrylic pressure-sensitive adhesive, a rubber pressure-sensitive adhesive, or a silicone pressure-sensitive adhesive.

In an eighteenth embodiment, the present disclosure provides a method according to the any one of the thirteenth to seventeenth embodiments, wherein the release agent is predominantly disposed at the first major surface.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, materials used in the examples available from commercial suppliers (e.g., Aldrich Chemical Co., Milwaukee, Wis.) and/or can be made by known methods.

TABLE OF MATERIALS USED IN THE EXAMPLES

| DESIGNATION | DESCRIPTION |
| --- | --- |
| Tape 232 | A rubber-based adhesive tape available as product code 3M SCOTCH 232 masking tape from 3M Co. |
| Tape 8403 | A silicone-based adhesive tape available as 3M SCOTCH 8403 polyester tape from 3M Co. |
| Tape 850 | An acrylic containing adhesive tape available as 3M SCOTCH 850 polyester tape from 3M Co. |
| PET | Polyethylene terephthalate resin |
| PETG | Copolyester available as EASTAR COPOLYESTER GN071, natural from Eastman Chemical Co., Kingsport, Tennessee. |
| TEA | Triethylamine |
| TPCL | Terephthaloyl chloride |

Measured % Fluorinated Release Agent Determination

The analysis was performed in triplicate using a Metrohm Combustion module MAID 1476 from Metrohm AG, Switzerland. The fluoride meter was calibrated with fluoride standards in the range of 1 to 100 ppm F (ORION 100 ppm F stock solution). Total Fluorinated Release Agent concentration in film was determined from the experimentally obtained averaged values.

Release Force of Adhesive Test Tape from Release Liner

The release force between the release liner and the Adhesive Test Tape of a laminate construction was measured using a 180-degree peel geometry according to the manufacturer's instructions as follows. An IMASS SP 2100 peel force tester (IMASS, Incorporated, Accord, Mass.) equipped with a 5.0-pound (2.27-kg) load cell was employed using the following parameters: a 1 inch (2.54 centimeters) wide test specimen, a peel rate of 1200 inches/minute (3053.3 cm/min), a 0.1 second delay before data acquisition, and a 0.2 second averaging time. The average of two test specimens was reported in grams/inches. Testing was done according to the following conditions for a minimum of 24 hrs before testing:

A) seven days at 22° C. (72° F.) and 50% relative humidity; or

B) seven days at 50° C., followed by an equilibration at 22° C. (72° F.) and 50% relative humidity.

Peel Adhesion Strength of Adhesive Test Tape

The peel adhesion strengths of the Adhesive Test Tape from a glass panel was measured at 72° F. (22° C.) and 50% relative humidity, and were designated as Peel Adhesion Strength 1 and 3. In addition, a second sample of the Adhesive Test Tape was first laminated to the release liner such that it contacted the release coating layer and exposed to various conditions as noted in the Release Force of Adhesive Test Tape from Release Liner test method, then evaluated for release force. Upon removal of the Adhesive Test Tape from the release liner the Tape was evaluated for its Peel Adhesion Strength as before, with this result being designated as Peel Adhesion Strength 2 and 4.

Testing was done immediately after removal of the Adhesive Test Tape from the release liner (within one minute) and applying the test tape to a clean glass plate using a 5 lb (2.3 kg) roller. An IMASS SP 2100 Slip/Peel Tester (IMASS, Incorporated, Accord, Mass.) equipped with a 10 pound (4.54 kg) load cell was employed using the following parameters: one inch (2.54 cm) wide test specimen, peel rate of 90 inches/minute (229 cm/min), two second delay before data acquisition, 180 peel geometry, and a ten second averaging time. The average of two test specimens was reported in grams/inches (g/cm).

Preparation of 1-(1,1,2,2,3,3,4,4,4-nonafluorobutyl-sulfonyl)piperazine

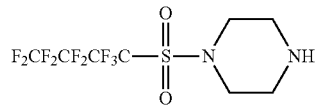

To a 3-neck 3 L round bottom equipped with a mechanical stirrer, addition funnel and a Claisen adaptor with thermocouple and reflux condenser was added piperazine (486 g, 5642 mmol) and TEA (400 mL, 2870 mmol). The reaction mixture was heated to 65° C. with continuous stirring. Once the reaction mixture reached 50° C., 1,1,2,2,3,3,4,4,4-nonafluorobutane-1-sulfonyl fluoride (500 mL, 2780 mmol) was added via addition funnel at such a rate so as to maintain a temperature below 90° C. Upon completion of addition, the temperature was raised to 95° C. and the reaction mixture was allowed to stir for 16 hr. The vessel was cooled to 50° C. and water (300 mL) was added followed by dichloromethane (500 mL). The resulting biphasic mixture was allow to stir for 5 min and then allowed to phase separate. The lower phase was removed, washed 3× with water (300 mL), brine (500 mL), and dried over sodium sulfate (250 g). The resulting yellow solution was filtered, solvent was removed via rotary evaporator and distilled at 250 mTorr and 80° C. to afford 713 g of 1-(1,1,2,2,3,3,4,4,4-nonafluorobutylsulfonyl)piperazine as a white solid.

Preparation of Fluorinated Release Agent (FRA)

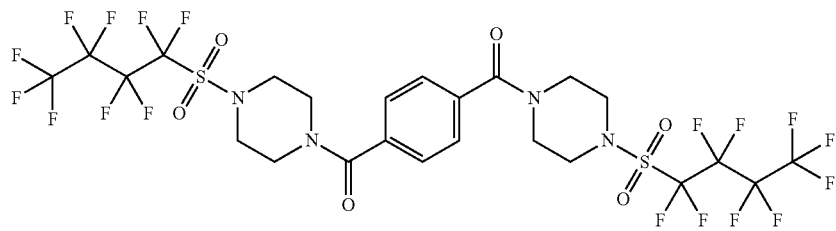 [SMILES: O=C(c1ccc(C(=O)N2CCN(S(=O)(=O)C(F)(F)C(F)(F)C(F)(F)C(F)(F)F)CC2)cc1)N1CCN(S(=O)(=O)C(F)(F)C(F)(F)C(F)(F)C(F)(F)F)CC1]

1-(1,1,2,2,3,3,4,4,4-nonafluorobutylsulfonyl)piperazine (36.47 g, 99.04 mmol), TEA (15 mL, 108 mmol) and dichloromethane (120 mL, 1872 mmol) were added to a 500 mL round bottom flask equipped with a magnetic stir bar, reflux condenser and addition funnel containing TPCL (16.8 g, 82.54 mmol) in THF (50 mL) under nitrogen atmosphere. TPCL solution was slowly added via addition funnel to the reaction mixture with vigorous stirring. Upon completion, the mixture was allowed to stir for 16 hr at room temperature. Water (300 mL) was then added to the yellow mixture. The product was collected via filtration and further washed with water (500 mL three times) to afford FRA as a white solid.

Example 1

Modified PET films of a 24 mils thickness were extruded in a dual layer construction (1:9) top layer to bottom layer. The top layer was co-extruded as a mixture of FRA and PET. The bottom layer consisted of PET. The films were extruded using an 18 mm twin screw extruder equipped with 3 independent feeders. Feeder A contained the PET for the bottom layer, Feeder B contained PET for the top layer, and Feeder C contained FRA. The extruded films were simultaneously biaxially oriented at a stretching ratio of 3:1 in the machine direction and 4:1 in the transverse (cross-web) direction with preheating temperatures at 96° C. for 15 s and thermally set at 232° C. for 15 s. The resultant film of contained 1.2 percent by weight of FRA.

Example 2

Modified PET films of a 24 mils thickness were extruded in a dual layer construction (1:9) top layer to bottom layer. The top layer was co-extruded as a mixture of FRA and PET/PETG (75:25). The bottom layer consisted of PET. The films were extruded using an 18 mm twin screw extruder equipped with 3 independent feeders. Feeder A contained the PET for the bottom layer, Feeder B contained PET/PETG for the top layer, and Feeder C contained FRA. The extruded films were simultaneously biaxially oriented at a stretching ratio of 3:1 in the machine direction and 4:1 in the transverse (cross-web) direction with preheating temperatures at 96° C. for 15 s and thermally set at 232° C. for 15 s. The resultant film of contained 1.6 percent by weight of FRA.

Examples 1 and 2 were tested according to the RELEASE FORCE OF ADHESIVE TEST TAPE FROM RELEASE LINER and PEEL ADHESION STRENGTH OF ADHESIVE TEST TAPE procedures. Results are reported in Table 1, below.

Peel Adhesion Strength of the test tapes from glass were:
Tape 232: 1329 grams/inches (523 g/cm);
Tape 8403: 528 grams/inches (208 g/cm); and
Tape 850: 1267 grams/inches (499 g/cm).

TABLE 1

| EXAMPLE | TAPE USED | AVERAGE RELEASE FORCE, grams/inch (g/cm) | | AVERAGE PEEL ADHESION STRENGTH 2, grams/inch (g/cm) | |
|---|---|---|---|---|---|
| | | Condition A | Condition B | Condition A | Condition B |
| 1 | 232 | 10.0 (3.9) | 49.3 (19.4) | 665.1 (261.85) | 561.5 (221.1) |
| 1 | 8403 | 20.3 (8.0) | 24.0 (9.4) | 563.3 (221.7) | 593.3 (233.6) |
| 1 | 850 | 12.4 (4.9) | 11.6 (4.6) | 954.1 (375.6) | 991.4 (390.3) |
| 2 | 232 | 12.1 (4.8) | 29.5 (11.6) | 1102.9 (434.2) | 1168.1 (459.9) |
| 2 | 8403 | 19.5 (7.7) | 32.8 (12.9) | 556.1 (218.9) | 637.8 (251.1) |
| 2 | 850 | 26.6 (10.5) | 23.4 (9.2) | 963.7 (379.4) | 1035.6 (492.9) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An adhesive article comprising a pressure-sensitive adhesive layer having first and second opposed major surfaces, wherein a first release liner is releasably adhered to the first major surface, and wherein the first release liner comprises a first thermoplastic polymer and a first release agent represented by the formula:

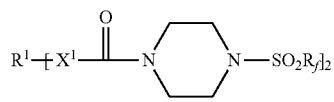

wherein
each $R^1$ represents a hydrocarbylene group having from 2 to 40 carbon atoms;

each $R_f$ independently represents a perfluorinated alkyl group having 3 to 5 carbon atoms; and each $X^1$ is —NH— or a covalent bond.

2. The adhesive article of claim 1, wherein $R^1$ has from 2 to 18 carbon atoms.

3. The adhesive article of claim 1, wherein each $X^1$ is —NH—.

4. The adhesive article of claim 1, wherein the first thermoplastic polymer is selected from the group consisting of polyesters, cellulosic polymers, polyamides, and polyolefins.

5. The adhesive article of claim 1, wherein the pressure-sensitive adhesive layer comprises at least one of an acrylic pressure-sensitive adhesive, a rubber pressure-sensitive adhesive, or a silicone pressure-sensitive adhesive.

6. The adhesive article of claim 1, further comprising a backing securely adhered to the second major surface.

7. The adhesive article of claim 1, further comprising a second release liner releasably adhered to the second major surface, wherein the second release liner independently comprises a second thermoplastic polymer and a second release agent independently represented by the formula:

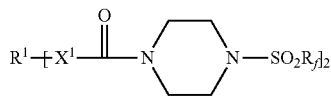

wherein $R^1$, $R_f$, and $X^1$ are as previously defined.

8. An adhesive article comprising a thermoplastic backing having first and second major surfaces, and a pressure-sensitive adhesive layer securely adhered to the first major surface, further comprising a release agent disposed at the second major surface, wherein the release agent is represented by the formula:

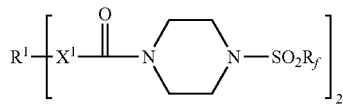

wherein each $R^1$ represents a hydrocarbylene group having from 2 to 40 carbon atoms;

each $R_f$ independently represents a perfluorinated alkyl group having 3 to 5 carbon atoms; and each $X^1$ is —NH— or a covalent bond.

9. A method of making an adhesive article, the method comprising contacting a pressure-sensitive adhesive layer having first and second major surfaces with a release liner, wherein the release liner comprises a thermoplastic polymer and a release agent represented by the formula:

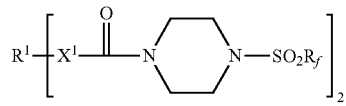

wherein each $R^1$ represents a hydrocarbylene group having from 2 to 40 carbon atoms;

each $R_f$ independently represents a perfluorinated alkyl group having 3 to 5 carbon atoms; and each $X^1$ is —NH— or a covalent bond.

10. The method of claim 9, wherein $R^1$ has from 2 to 18 carbon atoms.

11. The method of claim 9, wherein each $X^1$ is —NH—.

12. The method of claim 9, wherein the thermoplastic polymer is selected from the group consisting of polyesters, cellulosic polymers, polyamides, and polyolefins.

13. The method of claim 9, wherein the pressure-sensitive adhesive layer comprises at least one of an acrylic pressure-sensitive adhesive, a rubber pressure-sensitive adhesive, or a silicone pressure-sensitive adhesive.

* * * * *